(12) United States Patent
Butler et al.

(10) Patent No.: US 10,956,469 B2
(45) Date of Patent: Mar. 23, 2021

(54) SYSTEM AND METHOD FOR METADATA CORRELATION USING NATURAL LANGUAGE PROCESSING

(71) Applicant: International Business Machines Corporation, Armonk, NY (US)

(72) Inventors: Christopher J. Butler, Hawthorn East (AU); Lianhua Chi, Melbourne (AU); Bo Han, Campsie (AU); Juerg von Kaenel, Carlton (AU); Anna T. T. Phan, Brighton (AU)

(73) Assignee: International Business Machines Corporation, Armonk, NY (US)

( * ) Notice: Subject to any disclaimer, the term of this patent is extended or adjusted under 35 U.S.C. 154(b) by 440 days.

(21) Appl. No.: 15/399,970

(22) Filed: Jan. 6, 2017

(65) Prior Publication Data
US 2018/0196871 A1     Jul. 12, 2018

(51) Int. Cl.
| | |
|---|---|
| *G06F 16/33* | (2019.01) |
| *G06F 40/30* | (2020.01) |
| *G06F 40/205* | (2020.01) |
| *G06F 16/338* | (2019.01) |

(52) U.S. Cl.
CPC ........ *G06F 16/3344* (2019.01); *G06F 16/338* (2019.01); *G06F 40/205* (2020.01); *G06F 40/30* (2020.01)

(58) Field of Classification Search
CPC ......... G06F 17/30684; G06F 17/30696; G06F 17/2785; G06F 17/2705; G06F 16/3344; G06F 16/338; G06F 40/205; G06F 40/30
See application file for complete search history.

(56) References Cited

U.S. PATENT DOCUMENTS 5,933,822 A * 8/1999 Braden-Harder .......................... G06F 16/3344
7,996,393 B1 * 8/2011 Nanno .................. G06F 16/353
                                                  707/723

(Continued)

FOREIGN PATENT DOCUMENTS

| CN | 1571968 A | 1/2005 |
|---|---|---|
| CN | 103345528 A | 10/2013 |

OTHER PUBLICATIONS

T. Theodosiou et al., "Non-Linear Correlation of Content and Metadata Information Extracted from Biomedical Article Datasets," Journal of Biomedical Informatics, Feb. 2008, pp. 202-216, vol. 41, No. 1.

(Continued)

*Primary Examiner* — Neveen Abel Jalil
*Assistant Examiner* — Hubert Cheung
(74) *Attorney, Agent, or Firm* — Joseph Petrokaitis; Ryan, Mason & Lewis, LLP (57) ABSTRACT

A method for identifying correlated datasets comprises receiving a natural language query from a user, extracting electronic metadata from a plurality of computerized datasets, correlating the electronic metadata with the natural language query using natural language processing, calculating a correlation score between the natural language query and each of the plurality of electronic datasets, and returning a result to the user, wherein the result includes one or more datasets of the plurality of electronic datasets with a correlation score greater than or equal to a threshold.

16 Claims, 8 Drawing Sheets

(56) References Cited

U.S. PATENT DOCUMENTS

| | | | | |
|---|---|---|---|---|
| 8,438,595 | B1* | 5/2013 | Kannan | G11B 27/322 725/32 |
| 8,627,331 | B1* | 1/2014 | Grunwald | H04L 67/1087 718/106 |
| 8,959,574 | B2 | 2/2015 | Kuhlman et al. | |
| 9,201,927 | B1* | 12/2015 | Zhang | G06F 17/271 |
| 9,613,024 | B1* | 4/2017 | Zhang | G06F 17/2785 |
| 2005/0147246 | A1* | 7/2005 | Agrawal | G06F 21/6227 380/44 |
| 2007/0067728 | A1* | 3/2007 | Lo | G06Q 10/10 715/751 |
| 2009/0076795 | A1* | 3/2009 | Bangalore | G06F 17/2785 704/9 |
| 2010/0268720 | A1* | 10/2010 | Spivack | G06F 16/3334 707/756 |
| 2012/0209831 | A1* | 8/2012 | Rehman | G06F 16/24578 707/723 |
| 2013/0024440 | A1* | 1/2013 | Dimassimo | G06F 16/3325 707/709 |
| 2013/0054613 | A1* | 2/2013 | Bishop | G06F 16/93 707/748 |
| 2013/0226950 | A1* | 8/2013 | Ciaramita | G06F 16/90324 707/765 |
| 2013/0290022 | A1 | 10/2013 | Shah | |
| 2014/0236994 | A1* | 8/2014 | Aikawa | G06F 16/24578 707/772 |
| 2014/0283083 | A1* | 9/2014 | Gula | H04L 63/1433 726/25 |
| 2015/0073777 | A1* | 3/2015 | Assam | G06F 40/30 704/9 |
| 2015/0286747 | A1* | 10/2015 | Anastasakos | G06F 17/30917 707/776 |
| 2015/0339572 | A1* | 11/2015 | Achin | G06F 9/5011 706/46 |
| 2015/0356203 | A1* | 12/2015 | Allen | G06F 40/279 707/725 |
| 2015/0363167 | A1* | 12/2015 | Kaushik | G06F 7/24 707/753 |
| 2016/0110343 | A1* | 4/2016 | Kumar Rangarajan Sridhar | G06F 17/2715 704/9 |
| 2016/0124951 | A1* | 5/2016 | Barker | G06F 40/284 706/12 |
| 2016/0132572 | A1* | 5/2016 | Chang | G06F 17/30569 707/723 |
| 2017/0116172 | A1* | 4/2017 | Mungi | G06F 16/3331 |
| 2017/0116328 | A1* | 4/2017 | Bastide | G06F 16/3344 |
| 2017/0177795 | A1* | 6/2017 | Mabotuwana | G06F 19/321 |
| 2018/0189407 | A1* | 7/2018 | Arngren | H04L 51/36 |

OTHER PUBLICATIONS

L. Li et al.,"Topic Correlation Analysis for Cross-Domain Test Classification," Proceedings of the Twenty-Sixth AAAI Conference on Artificial Intelligence, Jul. 2012, pp. 998-1004.

W. Paik et al., "Applying Natural Language Processing (NLP) Based Metadata Extraction to Automatically Acquire User Preferences," Proceedings of the 1st International Conference on Knowledge Capture (K-CAP), Oct. 2001, pp. 116-122.

O. Yilmazel et al., "MetaExtract: An NLP System to Automatically Assign Metadata," Proceedings of the Joint ACM/IEEE Conference on Digital Libraries (JCDL), Jun. 2004, pp. 241-242.

B. Liu et al., "Mining Data Records in Web Pages," Proceedings of the 9th ACM SIGKDD International Conference on Knowledge Discovery and Data Mining, Aug. 2003, pp. 601-606.

T.S. Kim et al., "Semantic Structural Similarity for Clustering XML Documents," International Conference on Convergence and Hybrid Information Technology (ICCIT), Aug. 28-30, 2008, pp. 552-557, Daejeon, South Korea.

P. Spinosa et al., "NLP-Based Metadata Extraction for Legal Text Consolidation," 12th International Conference on Artificial Intelligence and Law (ICAIL), Jun. 2009, pp. 40-49.

* cited by examiner

| DS 1 | | | 105 |
|---|---|---|---|
| GAS | ... | REVENUE | |
| ... | ... | ... | |
| ... | ... | ... | |

*FIG. 1A*

| DS 2 | | | 110 |
|---|---|---|---|
| DIESEL | ... | RETURNS | |
| ... | ... | ... | |
| ... | ... | ... | |

*FIG. 1B*

| DS 3 | | 115 |
|---|---|---|
| GAS | ... | TOTAL |
| ... | ... | ... |
| ... | ... | ... |

*FIG. 1C*

| DS 4 | | 120 |
|---|---|---|
| WOOD | ... | TOTAL |
| ... | ... | ... |
| ... | ... | ... |

*FIG. 1D*

| DS 5 | | 125 |
|---|---|---|
| SALES | ... | TOTAL |
| ... | ... | ... |
| ... | ... | ... |

*FIG. 1E*

| DS 6 | | 130 |
|---|---|---|
| FOOD | ... | TOTAL |
| ... | ... | ... |
| ... | ... | ... |

SYSTEM AND METHOD FOR METADATA CORRELATION USING NATURAL LANGUAGE PROCESSING

BACKGROUND

Large amounts of data are generated from various sources including, for example, business transactions, social media and sensor data from, for example, data loggers and wireless sensor networks. It has become increasingly challenging to find related datasets for effective data management or insightful data analysis. For example, with increasing amounts of data, the likelihood of encountering irrelevant datasets also increases, which hinders effective data analysis.

Correlation indicates how closely two pieces of information are related. Correlation has applications in many predictive (e.g., as a form of causation) and information retrieval applications. A correlation can be obvious to observe, for example, umbrella sales vs. weather conditions. In other circumstances, correlations may be implicit and difficult to find, for example, the butterfly effect in chaos theory. Identifying correlations among datasets can be valuable when attempting to understand and/or discern data. Correlation between numerical values among different datasets has been studied. For example, correlation coefficients quantify statistical relationships between data values. However, methods for using textual metadata to determine relationships among datasets have received little or no attention.

SUMMARY

According to an exemplary embodiment of the present invention, a method for identifying correlated datasets comprises receiving a natural language query from a user, extracting electronic metadata from a plurality of computerized datasets, correlating the electronic metadata with the natural language query using natural language processing, calculating a correlation score between the natural language query and each of the plurality of electronic datasets, and returning a result to the user, wherein the result includes one or more datasets of the plurality of electronic datasets with a correlation score greater than or equal to a threshold.

According to an exemplary embodiment of the present invention, a system for identifying correlated datasets comprises a memory and at least one processor coupled to the memory, wherein the at least one processor is configured to receive a natural language query from a user, extract electronic metadata from a plurality of computerized datasets, correlate the electronic metadata with the natural language query using natural language processing, calculate a correlation score between the natural language query and each of the plurality of electronic datasets, and return a result to the user, wherein the result includes one or more datasets of the plurality of electronic datasets with a correlation score greater than or equal to a threshold.

According to an exemplary embodiment of the present invention, a computer program product for identifying correlated datasets comprises a computer readable storage medium having program instructions embodied therewith, the program instructions executable by a processor to cause the processor to perform a method comprising receiving a natural language query from a user, extracting electronic metadata from a plurality of computerized datasets, correlating the electronic metadata with the natural language query using natural language processing, calculating a correlation score between the natural language query and each of the plurality of electronic datasets, and returning a result to the user, wherein the result includes one or more datasets of the plurality of electronic datasets with a correlation score greater than or equal to a threshold.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which.

DETAILED DESCRIPTION

Exemplary embodiments of the invention will now be discussed in further detail with regard to dataset analysis and, in particular, to using natural language processing to identify correlated datasets based on textual metadata correlation. This invention may, however, be embodied in many different forms and should not be construed as limited to the embodiments set forth herein.

Embodiments of the present invention relate to systems and methods for identifying correlated datasets based on textual metadata correlation. For example, correlations between datasets are determined based on analysis of extracted metadata from a plurality of datasets. The derived correlation information can be used to measure data relevance in, for example, data management and text analytic systems.

According to an embodiment of the present invention, correlation information between a user's request and datasets for on demand business data analysis is provided. Correlations between users' requests and datasets are identified using metadata. In accordance with an embodiment, correlation information between users' requests and datasets is generated by applying natural language processing (NLP) techniques to textual metadata.

As used herein, "natural language processing (NLP)" can refer to a field of computer science, artificial intelligence, and computational linguistics corresponding to interactions between computers and human (natural) languages. Through NLP and natural language understanding (NLU), computers derive meaning from human or natural language input.

As used herein, "natural language understanding (NLU)" can refer to a category of natural language processing that disassembles and parses natural language input to determine appropriate syntactic and semantic schemes in order to derive meaning from the inputted language. NLU may rely on computational models which are based on linguistics to develop word meanings and correlations.

As used herein, "metadata" can refer to textual data which is embedded in electronic databases and/or electronic datasets, and provides information about the data in the electronic databases and/or electronic datasets. Metadata can include, but is not necessarily limited to, table column names and headers in Structured Query Language (SQL) databases such as DB2® and MySQL®. Metadata can also include, but is not necessarily limited to, JavaScript Object Notation (JSON) data keys in non-SQL databases such as MongoDB®. These column names, headers and keys are collectively known as attributes (also referred to herein as "fine-grained metadata"). Moreover, metadata also includes, but is not necessarily limited to, descriptions and tags in datasets, such as, for example, spreadsheets, comma-separated values (csv) files, or scrapped data from web sources (also referred to herein as "coarse-grained metadata").

In accordance with an embodiment of the present invention, metadata among various datasets and databases used in connection with NLP can include, but is not necessarily limited to, short, truncated, and/or ambiguous words. Metadata can contain valuable and complementary information to numerical data in many datasets and databases. The embodiments of the present invention apply to most datasets and databases as long as the data contains metadata.

Embodiments of the present invention provide concrete correlation scores between a user's request and retrieved data. Embodiments of the present invention, by capturing non-explicit correlations between users' requests and datasets, support accurate data retrieval based on correlation information, and answer questions by providing relevant data sources with correlation scores. Correlation can be automatically customized, or customizable by users to refine retrieved results, thereby helping users focus on datasets of interest for effective data management and analysis. The embodiments of the present invention do not require users to have advanced knowledge of the datasets, other than a relatively small number of keywords to query for access to relevant results.

Embodiments of the present invention may be used to provide preprocessing support (e.g., find patterns and relationships in data) for platforms, such as, for example, IBM Watson™ that use NLP and machine learning to reveal insights from large amounts of unstructured data.

As used herein, term "real-time" refers to output within strict time constraints. Real-time output can be understood to be instantaneous or on the order of milliseconds or microseconds. Of course, it should be understood that depending on the particular temporal nature of the system in which an embodiment of the invention is implemented, other appropriate timescales that provide approximately contemporaneous performance and output can be achieved.

In accordance with an embodiment of the present invention, textual metadata extraction utilizes a set of patterns which can be manually crafted or automatically determined by machine learning methods, such as, but not necessarily limited to, clustering and supervised text classification. Patterns may correspond to, for example, csv file headers, table column names, and keys in JSON-like records. Most unstructured data in databases can be extracted using such patterns. For more arbitrary metadata such as, for example, tables in a web page, certain Hypertext Markup Language (HTML) tags can be annotated and fed into a pattern recognition module to detect and extract the metadata. By defining metadata scope and specifying extraction strategies, the embodiments of the present invention retrieve multi-sourced datasets accompanied with a variety of metadata.

FIGS. 1A-1F illustrate representations of datasets DS 1, DS 2, DS 3, DS 4, DS 5, and DS 6 (105, 110, 115, 120, 125, and 130) and metadata. FIGS. 1A-1F provide illustrative datasets and metadata for a running example for purposes of explaining the embodiments of the present invention. Accordingly, it is to be understood that the embodiments of the present invention are not limited to the datasets and metadata in FIGS. 1A-1F. DS 1 (105) is a representation of a gasoline revenues dataset from company A, including tags for gasoline and revenue. DS 2 (110) is a representation of a diesel returns dataset from company A including tags for diesel and returns. DS 3 (115) is a representation of a gasoline sales dataset from company B including tags for gasoline and sales. DS 4 (120) is a representation of a wood production dataset from company A including tags for wood and production. DS 5 (125) is a representation of an aggregated petroleum sales dataset from organization C including tags for aggregated petroleum and sales. DS 6 (130) is a representation of a food sales dataset from company D including tags for food, sales, and retail.

In accordance with an embodiment of the present invention, correlation calculations can be performed at different granularities. For example, in accordance with an embodiment of the present invention, datasets are grouped based on coarse-grained metadata, including, for example, tags and description text, titles and background information. Then, the datasets are further related using fine-grained metadata, including, for example, column names, attributes and subsection information, to form detailed correlations within the group. The granularity can be tailored based on users' needs.

Coarse-Grained Dataset Correlation Calculation

In accordance with an embodiment of the present invention, individual datasets are categorized into different groups by using coarse-grained metadata associated with the datasets, such as, for example, dataset descriptions and tags. The coarse-grained metadata is extracted, and then correlation scores are calculated using methods such as, but not necessarily limited to, bag-of-words cosine similarity in NLP and information retrieval (IR).

Strategies are then applied to merge similar individual datasets into different groups. Such strategies may include, for example, use of a merge threshold and adopting the centroid of merged groups.

Embodiments of the present invention allow for the idea that there exist multiple ways of grouping datasets, and that the way of grouping data is relative to the information a user needs, which can be defined through search queries. For instance, if a user wants all the data from the fuel sector, then a grouping of DS 1-5 is appropriate. Similarly, if sales information is needed, then DS 1, DS 2, DS 3, DS 5, and DS 6 can be placed in the same group, as the data concerns sales. DS 4 relates to production and can be classified into another group.

Fine-Grained Dataset Correlation Calculation

Having grouped datasets in a coarse manner, a system, in accordance with an embodiment of the present invention, analyzes a relevant group of interest by analyzing correlations within the group using fine-grained metadata, such as, but not necessarily limited to, column names and attributes.

Taking a fuel sector group for example, there are five datasets DS 1, DS 2, DS 3, DS 4 and DS 5 which fall into this group. The fine metadata of each dataset can be extracted as follows:

DS 1: Gasoline, . . . , Revenue
DS 2: Diesel, . . . , Returns
DS 3: Gasoline, . . . , Total
DS 4: Wood, . . . , Total
DS 5: Sales, . . . , Total The system correlates inter-group datasets (e.g., DS 1-5) using the fine-grained metadata and distributional semantic similarity calculation methods explained herein below. The generated correlation value is proportional to the level of relation between corresponding datasets, so that a higher generated correlation value means a higher level of relation between corresponding datasets than a lower correlation value. In accordance with an embodiment of the present invention, correlations between datasets and a user's request can also be calculated.

Distributional Semantic Similarity Correlation Calculations

According to an embodiment of the present invention, calculating correlations for metadata is based on distributional semantic similarity. For example, by introducing semantic similarity, "total" in DS 3 is determined to be equivalent to "revenue" in DS 1 and is also determined to be equivalent to "returns" in DS 2. However, "revenue" from DS1 and "returns" from DS2 are determined to be different from "total" in DS 4. The reason is because DS4 refers to fuel production rather than fuel sales. In contrast, "total" in DS 3, "revenue" in DS1 and "returns" in DS2 refer to total sale numbers, although they do not have a direct link through the same metadata label or tag. In other words, while DS3, DS2 and DS1 utilize different labels, the labels can be synonymous. For example, by applying synonyms, "revenue" can be considered the same as "returns" and "total" in the context of sales. However, synonyms are not applicable when "total" in DS4 relates to production, and not to sales, revenues or returns.

In accordance with embodiments of the present invention, distributional semantics automatically captures word relations based on contextual words that the system finds in unstructured data. For example, although "revenue" and "total" are different words, their similar corresponding context words (e.g., "Gas" in headers) suggests to the system that these two words are to some extent the same. Leveraging distributional semantics for metadata correlation enables the system to perform improved capturing of implicit correlations among datasets when compared with previous methods for determining correlations between computerized datasets in computerized databases. As used herein, "unstructured data" can refer to data that does not have a pre-defined data model or is not organized in a pre-defined manner, such as, but not necessarily limited to, emails, word processor documents, and messages.

The embodiments of the present invention are not necessarily limited to the use of distributional semantic similarity methods, and other methods for quantifying and categorizing semantic similarities between linguistic items, whether or not based on their distributional properties in samples of language data, can be used. Other methods include, for example, applying ontology-based clustering to group similar items, and Brown clustering that organizes items in a hierarchical structure.

Figure 1A:
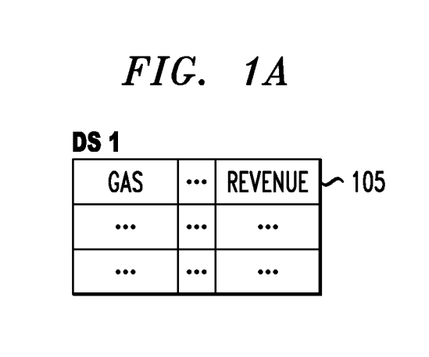
FIGS. 1A-1F provide illustrative datasets and metadata for a running example for purposes of explaining the embodiments of the present invention.
Figure 1B:
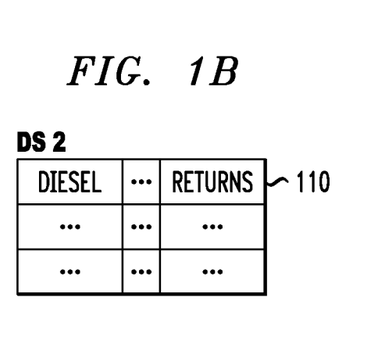
Figure 1C:
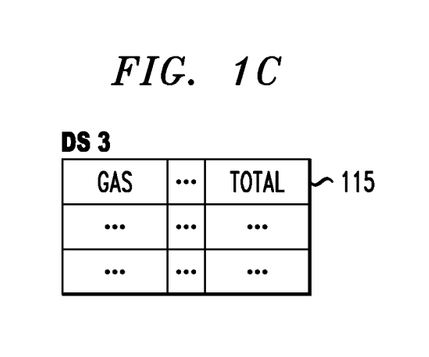
Figure 1D:
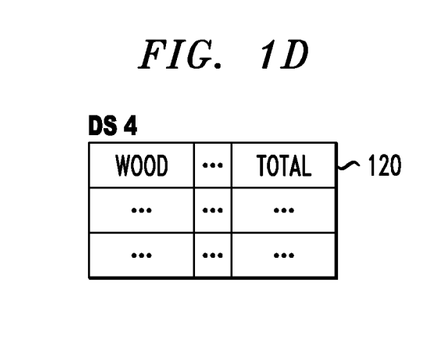
Figure 1E:
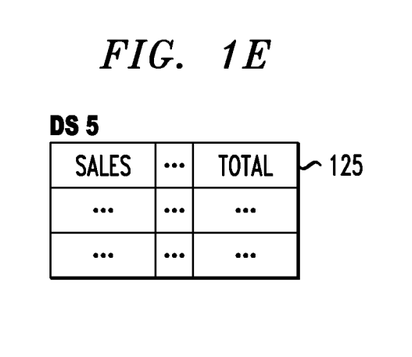
Figure 1F:
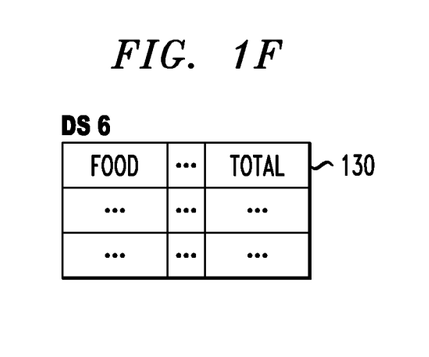
Figure 2:
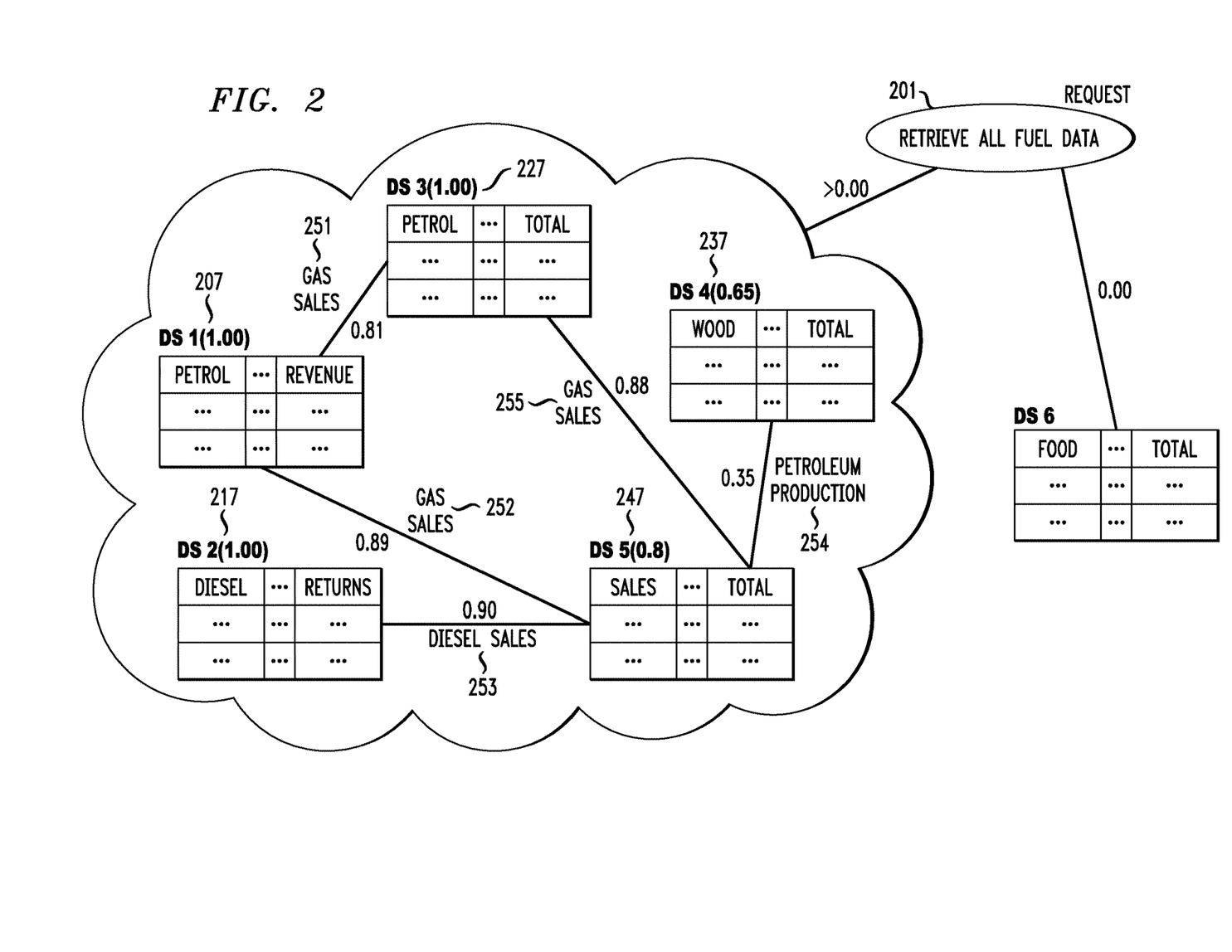
FIG. 2 illustrates resultant correlations in the running example, in accordance with an embodiment of the present invention

Referring to FIG. 2, which illustrates resultant correlations in the running example, in accordance with an embodiment of the present invention, having calculated correlations between word pairs, the system calculates average correlations 251-255 between two datasets by aggregation, for example, by summing up and normalizing word level correlations. In addition, representative semantic words between two datasets are used to represent the type of correlations, resulting in relationships (e.g., gasoline sales: 0.89 between DS 1 and DS 5, where 0.89 represents a normalized weight (e.g., between 0 and 1 corresponding to 0%-100%) showing a correlation strength corresponding to gasoline sales between DS1 and DS 5).

The resultant correlations annotated in FIG. 2 illustrate different strengths of correlations and the types of correlations. For example, the values 207, 217, 227, 237 and 247 next to the table names represent a correlation score (e.g., between 0 and 1 corresponding to 0%-100%) between that table and the user's request 201.

By way of non-limiting example, a user's query may state "all fuel sale datasets with more than a 0.7 correlation value", and the resultant datasets in FIG. 2 would be DS 1, 2, 3, 5. The searching process undertaken by the system can include, for example:

(a) find datasets with sales (e.g., DS 5 is selected)
(b) find correlated datasets and filter by both correlation type (fuel sales) and strength (>0.70) (e.g., DS 1, 2, 3 are selected and DS 4 is discarded)
(c) merge all DS results and return relevant datasets and their correlation information to users for downstream data analysis.

Figure 3A:
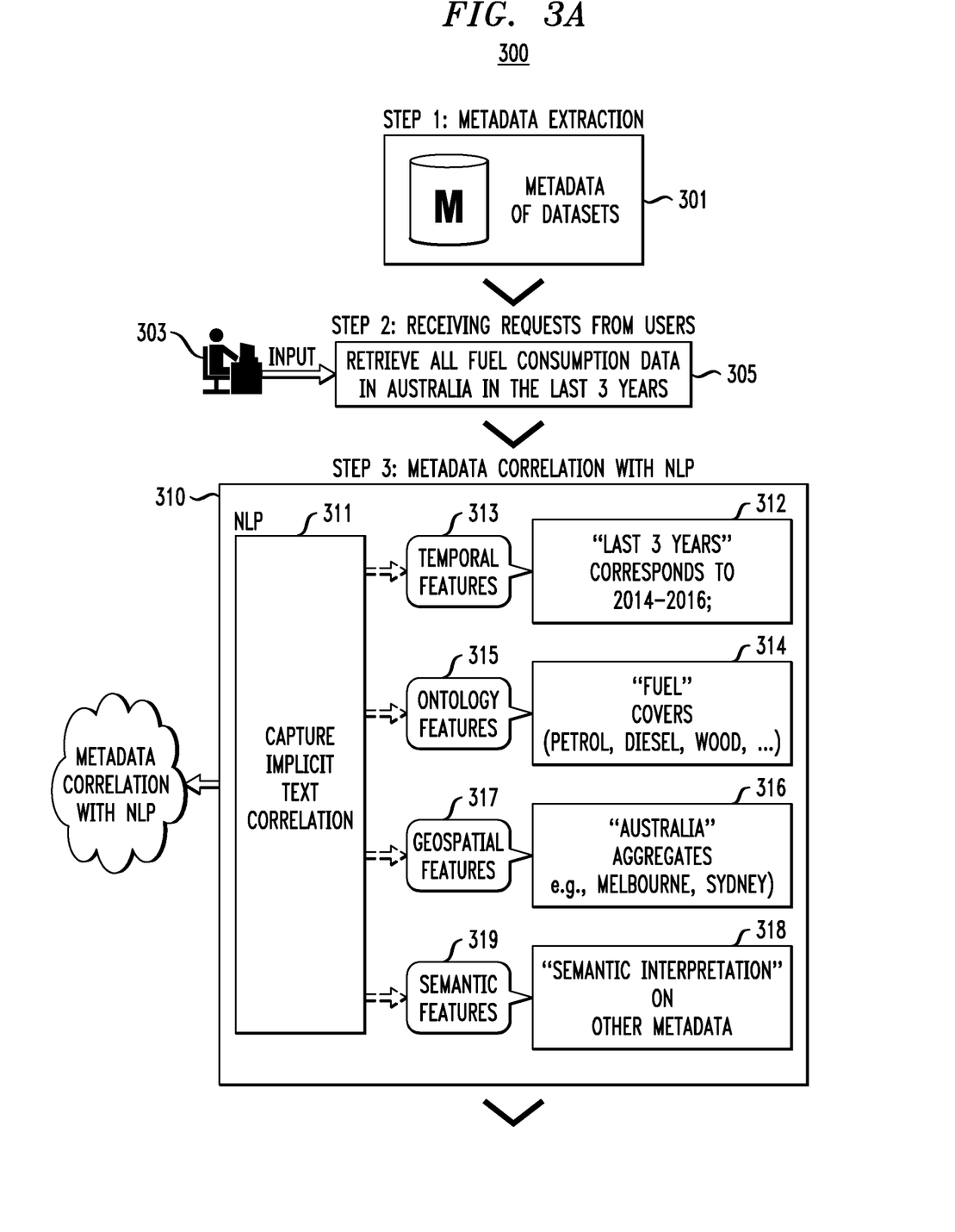
FIGS. 3A and 3B illustrate a process for retrieving correlated datasets in connection with a practical example, according to an exemplary embodiment of the present invention.
Figure 3B:
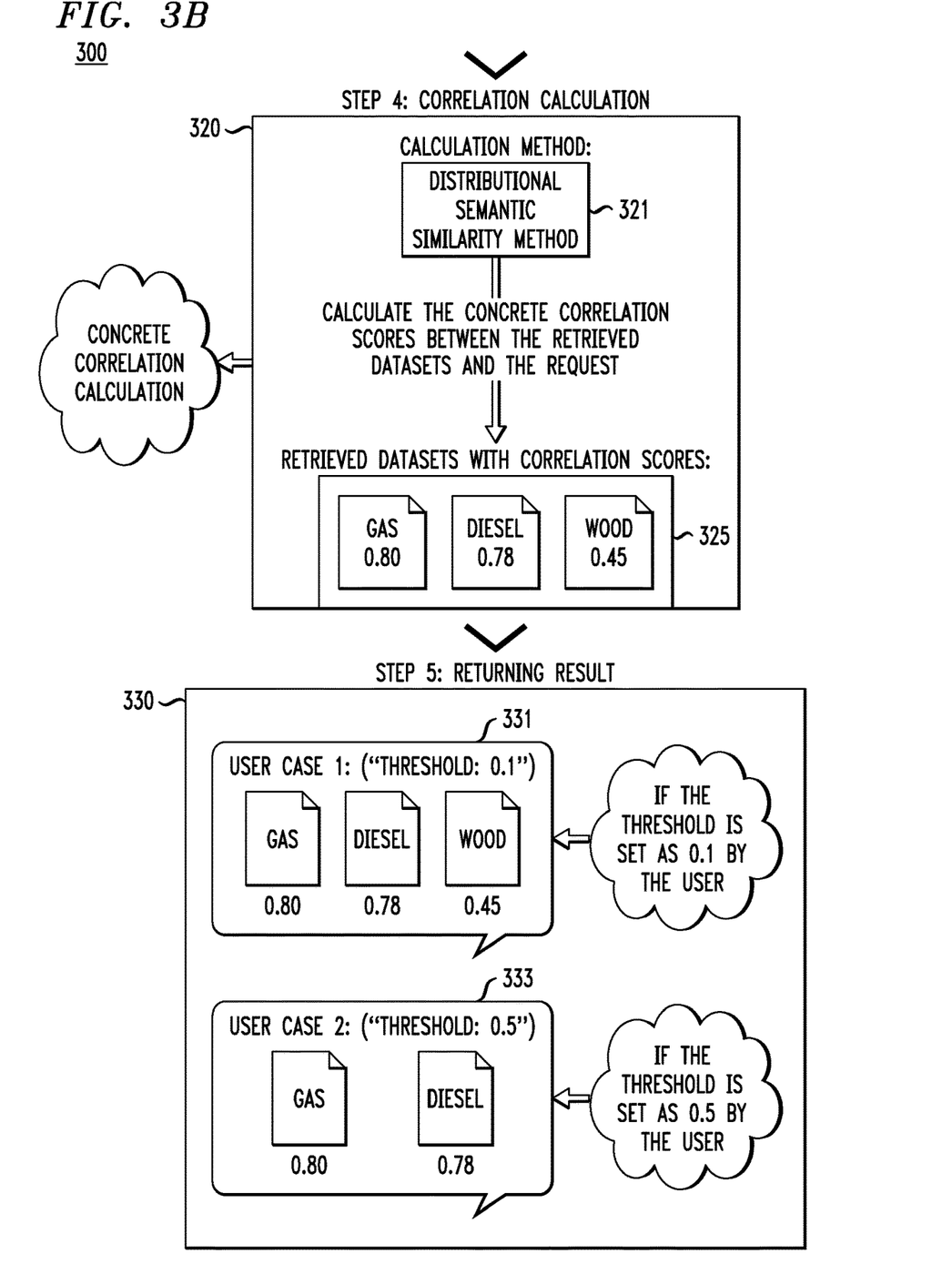

FIGS. 3A and 3B illustrate a process 300 for retrieving correlated datasets in connection with a practical example, according to an exemplary embodiment of the present invention. In accordance with an embodiment of the present invention, given a user's informational needs, correlated datasets can be retrieved by specifying one or more concrete queries.

At block 301, metadata is extracted in a data preparation stage. Known metadata extraction tools and methods can be used to extract the metadata from the datasets. For example, NLP systems to automatically assign metadata can be used in this step. NLP and machine learning-based automatic metadata extraction may be performed, which processes textual data to extract explicit and implicit metadata elements including, but not necessarily limited to, proper names, numeric concepts, and topic/subject information. A system, in accordance with an embodiment of the present invention, can include components that use NLP to extract terms and phrases found within sentences, use shallow parsing rules and multiple levels of NLP tagging, extract metadata over sentence boundaries using HTML structure and syntactic clues to determine the electronic location of the contents of an element, and compare text in the electronic location to clue words developed by analyzing previous textual data. The clue words can be used to determine which metadata elements are present. Computers are able to provide unbiased clue word selections, a task which human experts are not capable of performing. For example, the data volume and variety are beyond the capabilities of humans to process efficiently and without bias.

At block 305, requests are received from one or more users 303. A request can be transmitted from a device of a user 303, such as, for example, a personal computer, portable computer, smart phone, tablet, personal digital assistant (PDA), via a communication network, to one or more components for receiving and processing the user requests.

The communication network can include WiFi, BLUETOOTH, IEEE 802.11, and/or networks, including but not limited to, a local area network (LAN), wide area network (WAN), cellular network, ad hoc networks, WANET, satellite network or the Internet.

For purposes of explanation, the request/query is "Retrieve all fuel consumption data in Australia in the last 3 years." It is to be understood that the embodiments of the present invention are not limited to this request, and other user requests can be received and processed. The query is expanded by NLP to include other related terms. For example, fuel can be expanded to gasoline, natural gas, oil, wood, etc.

At block 310, metadata correlation with NLP is performed. In other words, NLP is used to correlate the metadata. By making use of NLP techniques, a system in accordance with an embodiment of the present invention, captures implicit text correlations 311 from, for example, four types of feature perspectives, including, but not necessarily limited to, temporal 312, ontology 314, geospatial 316 and semantic 318 features. In this step at block 310, by querying the metadata of datasets, this system returns all potential datasets relevant to the user's request. For example, in the working example, three relevant datasets "Gasoline", "Diesel" and "Wood" are retrieved.

More specifically, temporal features 312 correspond to time constraints in the user request (e.g., last three years), and ontology features 314 correspond to taxonomic classifications in the user request (e.g., fuel). For example, ontology can refer to the naming and definition of the types, properties, and interrelationships of entities or elements that may be the subject of a dataset. Geospatial features 316 correspond to geographical constraints in the user request (e.g., Australia), and semantic features 318 correspond to any features that add to or explain the meaning of words in the user requests. For example, semantics relates to the naming of variables, classes and functions in a computer language, and how a computer realizes the meaning of words. The semantics produced by computer algorithms are based on extremely large volumes (e.g. terabytes) of data, and provide consistent and un-biased results that a human cannot provide.

Referring to FIG. 3B, at block 320, correlation calculations are performed by the system. Referring to block 321, using the distributional semantic similarity method, which is discussed herein above, the concrete correlation scores between a user's request and datasets retrieved in the previous steps can be calculated. In keeping with the working example, the corresponding correlation score for each retrieved dataset as shown in block 325 is: "Gasoline 0.80", "Diesel 0.78" and "Wood 0.45".

At block 330, results are returned to the user 303. The result can be returned to a user device via, for example, a communication network as described herein above. Referring to blocks 331 and 333, users can specify a threshold for the correlation score and receive the datasets with correlation scores higher than or equal to the threshold. In keeping with the working example, if the threshold is set as 0.1, the three datasets "Gasoline", "Diesel" and "Wood" are returned by the system. However, if the threshold is set as 0.5, for example, two datasets "Gasoline" and "Diesel" are returned.

In accordance with embodiments of the present invention, NLP is leveraged for processing textual metadata in a plethora of existing datasets, non-explicit correlation scores are captured by collectively using NLP techniques incorporating, for example, temporal, semantic, ontology, geospatial features, and users are able to easily identify relevant datasets for their organizations and/or other needs.

Figure 4:
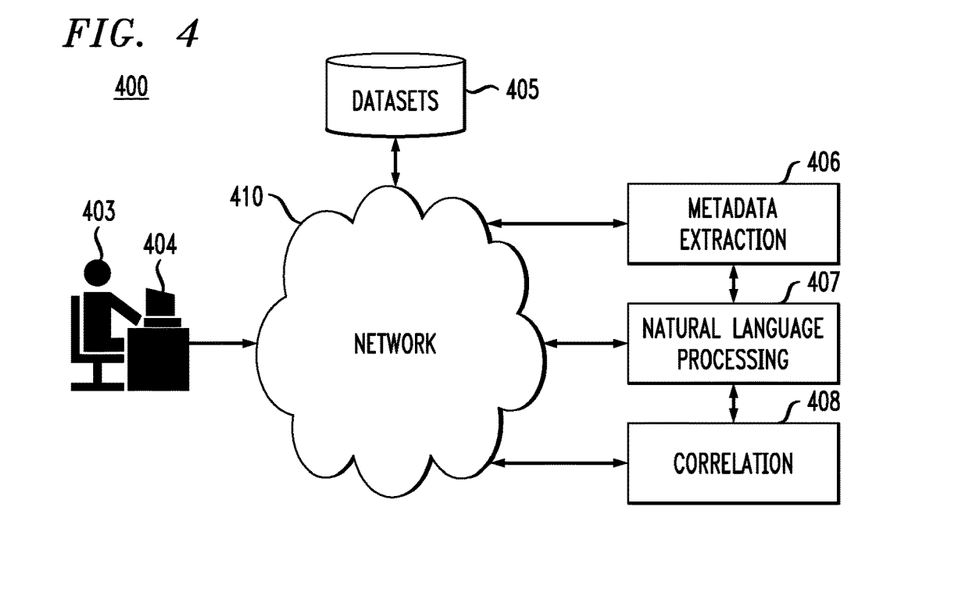
FIG. 4 is block diagram illustrating a system for identifying correlated datasets, according to an exemplary embodiment of the present invention.

FIG. 4 is block diagram illustrating a system for identifying correlated datasets, according to an exemplary embodiment of the present invention. As shown in FIG. 4 by lines and/or arrows, the components of the system 400 are operatively connected to each other via, for example, physical connections, such as wired and/or direct electrical contact connections, and/or wireless connections, such as, for example, WiFi, BLUETOOTH, IEEE 802.11, and/or networks, including but not limited to, a local area network (LAN), wide area network (WAN), cellular network, ad hoc networks, WANET, satellite network or the Internet. For example, a network 410 can operatively link components 404, 405, 406, 407, and 408 of the system 400.

By way of non-limiting example, in accordance with an embodiment of the present invention, referring to FIG. 4, the system includes a user device 404 that is used by, for example, a user 403, to input a natural language query, such as the query shown in block 305 in FIG. 3A, via an appropriate user interface on the user device 404. The user device 404 can include, but is not necessarily limited to personal computer (PC), portable computer, and/or smart mobile device, such as a smart phone or tablet that can, for example, transmit the query to a correlation engine 408 via network 410. The user device 404 can be configured to communicate wirelessly with the components 405-408 of the system 400 over the network 410. NLP via the NLP component 407 can be used to expand the natural language query to include one or more terms in addition to original terms of the query, which may be synonymous substitutes for the original terms.

The metadata extraction module extracts electronic metadata from a plurality of computerized datasets 405. The extraction is performed using NLP, which is performed via an NLP module 407. The computerized datasets 405 include, for example, organizational data, such as, but not necessarily limited to, sales, production, manufacturing, employee, student, medical, patient and/or financial data in electronic form, or any other types of electronic data that can associated with an organization or business. The datasets 405 can be part of one or more computerized databases. The datasets 405 can be, for example, cloud-based. The datasets 405 are electronically accessible by metadata extraction and correlation components 406 and 408, for example, via the network 410 or directly.

A correlation component 408 correlates the extracted electronic metadata with the natural language query using NLP provided via the NLP component 407. As noted above, correlating of the electronic metadata can include capturing one or more implicit correlations using for example, temporal, ontology, geospatial and/or semantic features. The correlation component also calculates a correlation score between the natural language query and each of the plurality of electronic datasets. As noted above, the calculating can be performed using a distributional semantic similarity method, which can include determining an equivalence between a first label used in one dataset of the plurality of datasets, and a second label used in another dataset of the plurality of datasets, wherein the second label is different from the first label, but is determined to be synonymous to the first label. In accordance with an embodiment of the present invention, the labels can be metadata labels or tags, such as revenue and/or sales. The distributional semantic similarity method can also comprise automatically capturing one or more word relations between the electronic metadata of two or more of the plurality of datasets based on one or more contextual words found in unstructured data.

The correlation component 408 is further configured to calculate correlations between two or more datasets by aggregation, wherein the aggregation includes summing and normalizing word level correlations. The correlation component 408 is also configured to group two or more datasets in a group with each other based on coarse-grained metadata, and to determine one or more correlations between the two or more datasets in the group based on fine-grained metadata.

The correlation component 408 returns a result to the user, via for example the network 410 and user device 404. The result includes one or more datasets of the plurality of electronic datasets with a correlation score greater than or equal to a threshold, and can be provided to a user in real-time with respect to transmission of the query from the user device 404 to the correlation component 408.

Figure 5:
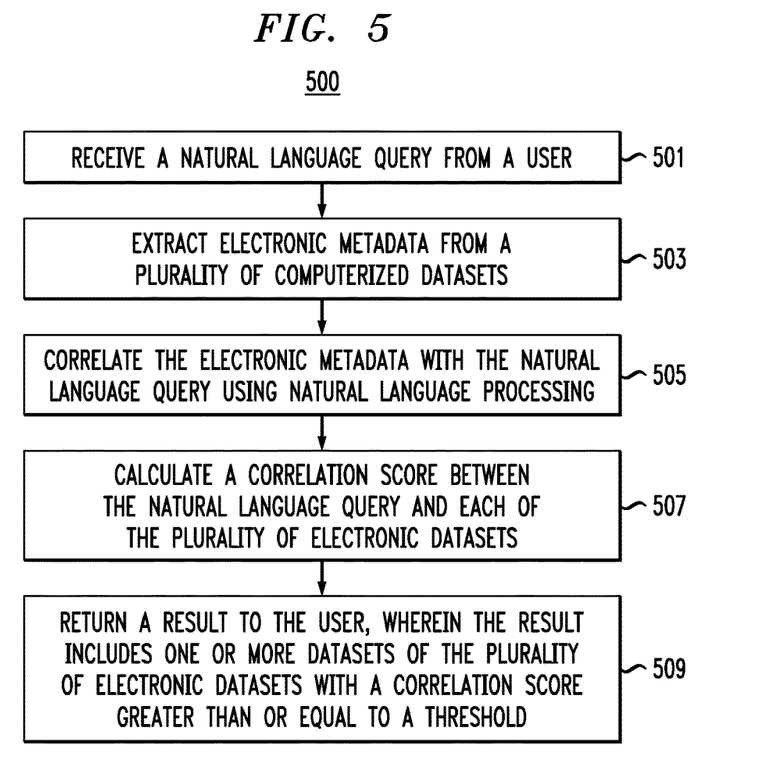
FIG. 5 is a flow diagram of a process for identifying correlated datasets, according to an exemplary embodiment of the invention.

FIG. 5 is a flow diagram of a process for identifying correlated datasets, according to an exemplary embodiment of the invention. Referring to FIG. 5, the process 500 includes, at block 501, receiving a natural language query from a user. For example, as noted above, a user 403 can input a natural language query via an appropriate user interface on user device 404, and the query can be transmitted to the correlation engine 408 via the network 410. NLP can be used to expand the natural language query to include one or more terms in addition to original terms of the query. The additional terms may be synonymous substitutes for the original terms.

At block 503, electronic metadata is extracted from a plurality of computerized datasets. In accordance with an embodiment of the present invention, the extraction is performed using NLP.

At block 505, the extracted electronic metadata is correlated with the natural language query using NLP. Correlating of the electronic metadata can include capturing one or more implicit correlations using for example, temporal, ontology, geospatial and/or semantic features. The process 500 further includes, at block 507, calculating a correlation score between the natural language query and each of the plurality of electronic datasets. As noted above, the calculating can be performed using a distributional semantic similarity method, which can include determining an equivalence between different but synonymous labels. The distributional semantic similarity method can also comprise automatically capturing one or more word relations between the electronic metadata of two or more of the plurality of datasets based on one or more contextual words found in unstructured data.

Correlations between two or more datasets can also be calculated by aggregation, including, for example, summing and normalizing word level correlations. Two or more datasets can be grouped in a group with each other based on coarse-grained metadata, and one or more correlations between the two or more datasets in the group can be determined based on fine-grained metadata.

At block 509, a result including one or more datasets of the plurality of electronic datasets with a correlation score greater than or equal to a threshold is returned to the user. The threshold can be set by a user or automatically determined by the system using, for example, machine-learning techniques based on previous activity of the user or other users.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
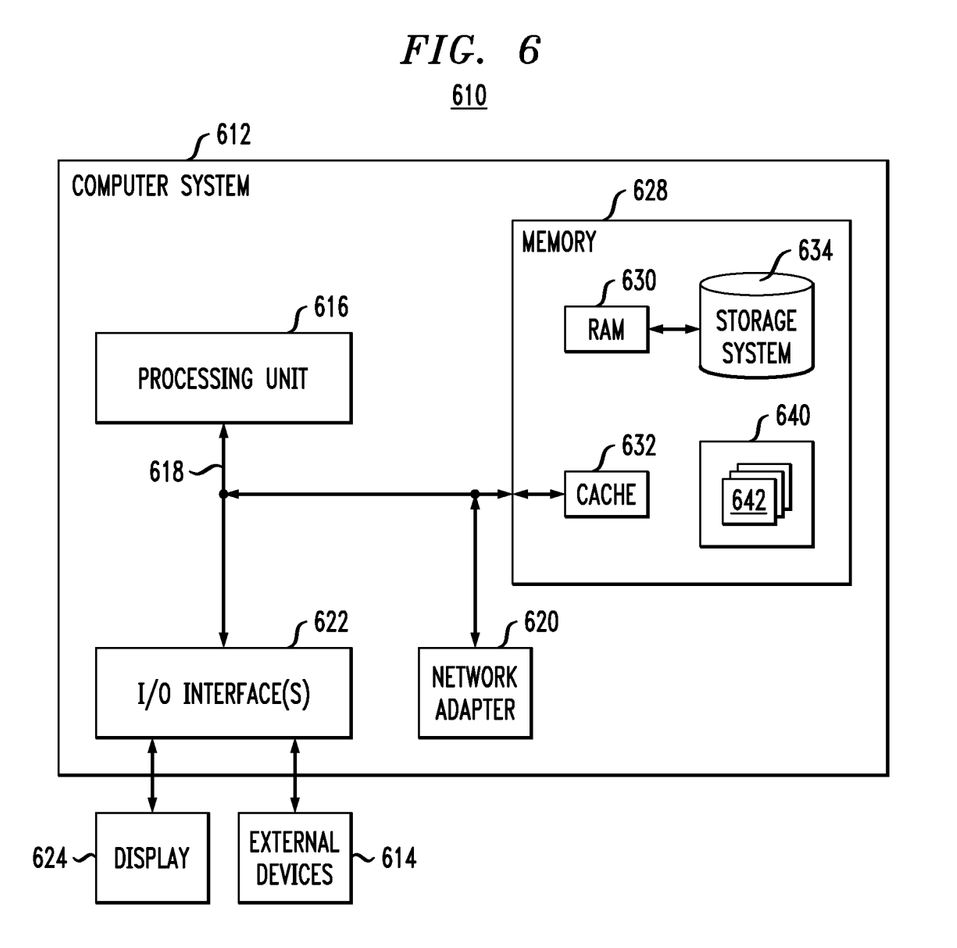
FIG. 6 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 6, in a computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

The bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 612 typically includes a variety of computer system readable media. Such media may be any available media that is accessible by computer system/server 612, and it includes both volatile and non-volatile media, removable and non-removable media.

The system memory 628 can include computer system readable media in the form of volatile memory, such as random access memory (RAM) 630 and/or cache memory 632. The computer system/server 612 may further include other removable/non-removable, volatile/nonvolatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 618 by one or more data media interfaces. As depicted and described herein, the memory 628 may include at least one program product having a set (e.g., at least one) of program modules that are configured to carry out the functions of embodiments of the invention. A program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc., one or more devices that enable a user to interact with computer system/server 612, and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

It is understood in advance that although this disclosure includes a detailed description on cloud computing below, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Computing node 610 in FIG. 6 can be an example of a cloud computing node. Computing node 610 is only one example of a suitable cloud computing node and is not intended to suggest any limitation as to the scope of use or functionality of embodiments of the invention described herein. Regardless, computing node 610 is capable of being implemented and/or performing any of the functionality set forth hereinabove. It is also to be understood that computing node 610 is not necessarily a cloud computing node.

Figure 7:
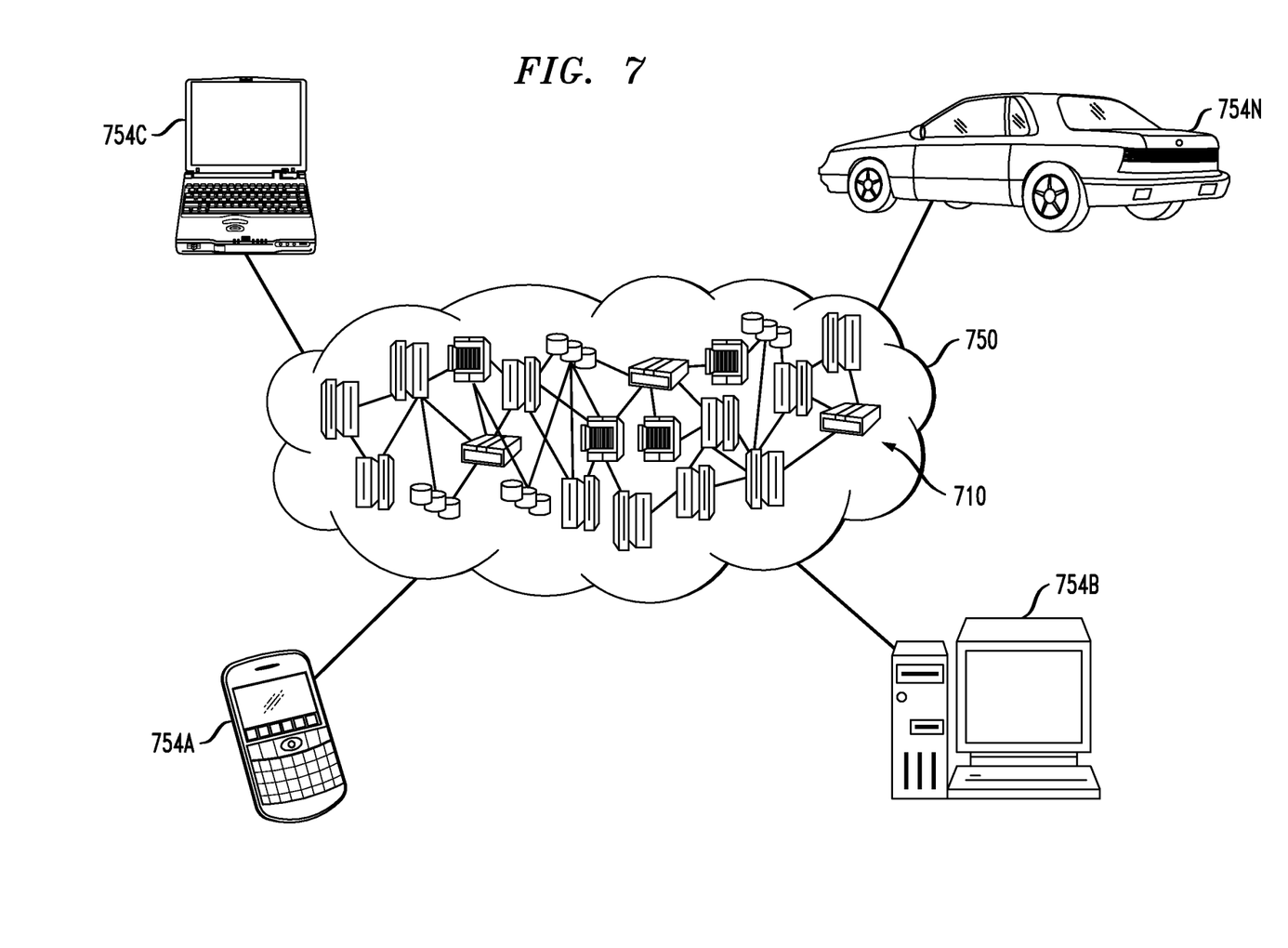
FIG. 7 depicts a cloud computing environment, according to an exemplary embodiment of the present invention.

Referring now to FIG. 7, illustrative cloud computing environment 750 is depicted. As shown, cloud computing environment 750 comprises one or more cloud computing nodes 710 with which local computing devices used by cloud consumers, such as, for example, a wearable device (not explicitly shown), a personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
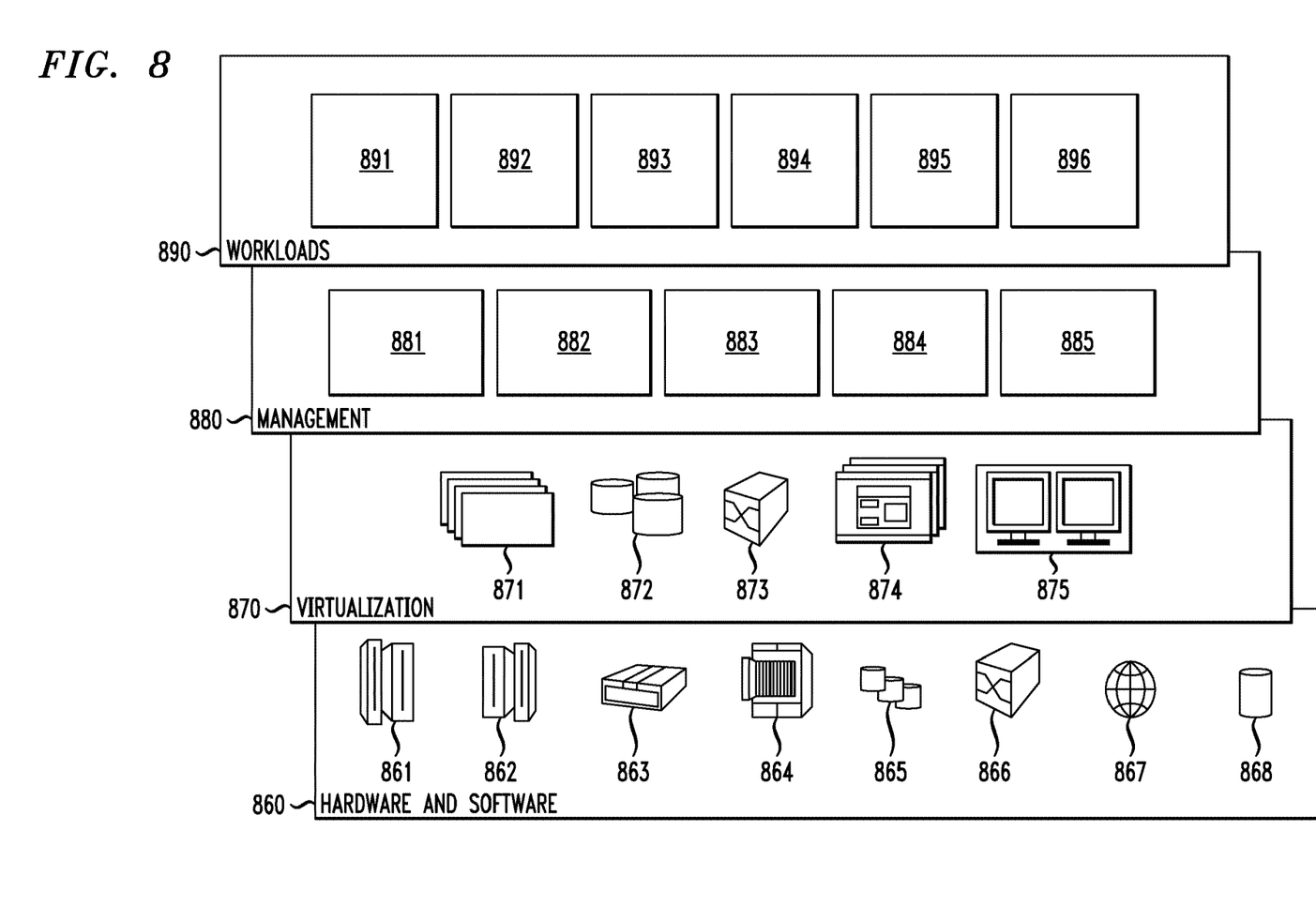
FIG. 8 depicts abstraction model layers, according to an exemplary embodiment of the invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and correlated dataset identification 896, which may implement the functionality described above with respect to FIGS. 1-7.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer implemented method for identifying correlated datasets, comprising:
receiving a natural language query from a user via at least one user device operatively connected to a network;
extracting, based on the natural language query, electronic metadata from a plurality of computerized datasets accessible via the network, wherein the electronic metadata is embedded in the plurality of computerized datasets, comprises coarse-grained and fine-grained metadata, and comprises information for facilitating storage and retrieval of the plurality of computerized datasets;
correlating the electronic metadata with the natural language query using natural language processing, wherein the natural language processing comprises parsing the natural language query into one or more schemes and associating the one or more schemes with the electronic metadata;
calculating a plurality of correlation scores between the natural language query and each of the plurality of computerized datasets, wherein a given correlation score is calculated for each of the plurality of computerized datasets based on a result of the natural language processing;
returning to the user, via the network, one or more correlated datasets of the plurality of computerized datasets with a correlation score greater than or equal to a threshold;
grouping two or more of the plurality of computerized datasets in a group with each other based on the coarse-grained metadata;
determining one or more associations between the two or more of the plurality of computerized datasets in the coarse-grained metadata group based on the fine-grained metadata;
wherein the correlating of the electronic metadata with the natural language query comprises capturing one or more implicit text correlations between the electronic metadata of the plurality of computerized datasets and the natural language query using one or more features;
wherein the calculating is performed using a distributional semantic similarity method;
wherein the distributional semantic similarity method comprises automatically capturing one or more word relations between the electronic metadata of the two or more of the plurality of computerized datasets based on one or more contextual words found in unstructured data;
calculating correlations between words of the two or more of the plurality of computerized datasets;
calculating correlations between the two or more of the plurality of computerized datasets by aggregation, wherein the aggregation includes summing and normalizing the calculated word level correlations;

wherein determining the one or more associations between the two or more of the plurality of computerized datasets comprises:
  determining one or more representative semantic words between the two or more of the plurality of computerized datasets representing a correlation type between the two or more of the plurality of computerized datasets; and
  computing a normalized weight indicating a correlation strength of the correlation type between the two or more of the plurality of computerized datasets;
  wherein the correlation type comprises a data type describing data in the two or more of the plurality of computerized datasets;
filtering the plurality of computerized datasets according to at least one correlation type and corresponding correlation strength; and
selecting the one or more correlated datasets of the plurality of computerized datasets to return to the user based at least in part on the filtering;
wherein the computer implemented method is performed by at least one computer system comprising at least one memory and at least one processor coupled to the at least one memory.

2. The computer implemented method according to claim 1, wherein the extracting is performed using the natural language processing.

3. The computer implemented method according to claim 1, further comprising using the natural language processing to expand the natural language query to include one or more terms in addition to original terms of the query.

4. The computer implemented method according to claim 1, wherein the one or more features are selected from the group consisting of temporal, ontology, geospatial and semantic features.

5. The computer implemented method according to claim 1, wherein:
  the distributional semantic similarity method further comprises determining equivalence between a first label used in a first dataset of the plurality of computerized datasets, and a second label used in a second dataset of the plurality of computerized datasets, wherein the second label is determined to be synonymous to the first label.

6. The computer implemented method according to claim 1, wherein the fine-grained metadata comprises a plurality of attributes comprising column names, headers and data keys.

7. The computer implemented method according to claim 1, wherein the coarse-grained metadata comprises descriptions and tags in the two or more computerized datasets.

8. A system for identifying correlated datasets, comprising:
  a memory and at least one processor coupled to the memory, wherein the at least one processor is configured to:
    receive a natural language query from a user via at least one user device operatively connected to a network;
    extract, based on the natural language query, electronic metadata from a plurality of computerized datasets accessible via the network, wherein the electronic metadata is embedded in the plurality of computerized datasets, comprises coarse-grained and fine-grained metadata, and comprises information for facilitating storage and retrieval of the plurality of computerized datasets;
    correlate the electronic metadata with the natural language query using natural language processing, wherein the natural language processing comprises parsing the natural language query into one or more schemes and associating the one or more schemes with the electronic metadata;
    calculate a plurality of correlation scores between the natural language query and each of the plurality of computerized datasets, wherein a given correlation score is calculated for each of the plurality of computerized datasets based on a result of the natural language processing;
    return to the user, via the network, one or more correlated datasets of the plurality of computerized datasets with a correlation score greater than or equal to a threshold;
    group two or more of the plurality of computerized datasets in a group with each other based on coarse-grained metadata;
    determine one or more associations between the two or more of the plurality of computerized datasets in the coarse-grained metadata group based on fine-grained metadata;
    wherein in correlating of the electronic metadata with the natural language query, the at least one processor is configured to capture one or more implicit text correlations between the electronic metadata of the plurality of computerized datasets and the natural language query using one or more features;
    wherein in performing the calculating the at least one processor is further configured to use a distributional semantic similarity method comprising automatically capturing one or more word relations between the electronic metadata of the two or more of the plurality of computerized datasets based on one or more contextual words found in unstructured data;
    calculate correlations between words of the two or more of the plurality of computerized datasets;
    calculate correlations between the two or more of the plurality of computerized datasets by aggregation, wherein the aggregation includes summing and normalizing the calculated word level correlations;
    wherein in determining the one or more associations between the two or more of the plurality of computerized datasets, the at least one processor is further configured to:
      determine one or more representative semantic words between the two or more of the plurality of computerized datasets representing a correlation type between the two or more of the plurality of computerized datasets; and
      compute a normalized weight indicating a correlation strength of the correlation type between the two or more of the plurality of computerized datasets;
      wherein the correlation type comprises a data type describing data in the two or more of the plurality of computerized datasets;
    filter the plurality of computerized datasets according to at least one correlation type and corresponding correlation strength; and
    select the one or more correlated datasets of the plurality of computerized datasets to return to the user based at least in part on the filtering.

9. The system according to claim 8, wherein in performing the extracting, the at least one processor is further configured to use the natural language processing.

10. The system according to claim 8, wherein the at least one processor is further configured to use the natural language processing to expand the natural language query to include one or more terms in addition to original terms of the query.

11. The system according to claim 8, wherein the one or more features are selected from the group consisting of temporal, ontology, geospatial and semantic features.

12. The system according to claim 8, wherein the distributional semantic similarity method further comprises determining equivalence between a first label used in a first dataset of the plurality of computerized datasets, and a second label used in a second dataset of the plurality of computerized datasets, wherein the second label is determined to be synonymous to the first label.

13. The system according to claim 8, wherein the fine-grained metadata comprises a plurality of attributes comprising column names, headers and data keys.

14. The system according to claim 8, wherein the coarse-grained metadata comprises descriptions and tags in the two or more computerized datasets.

15. A computer program product for identifying correlated datasets, the computer program product comprising a computer readable storage medium having program instructions embodied therewith, the program instructions executable by a processor to cause the processor to perform a method comprising:
- receiving a natural language query from a user, via at least one user device operatively connected to a network;
- extracting, based on the natural language query, electronic metadata from a plurality of computerized datasets accessible via the network, wherein the electronic metadata is embedded in the plurality of computerized datasets, comprises coarse-grained and fine-grained metadata, and comprises information for facilitating storage and retrieval of the plurality of computerized datasets;
- correlating the electronic metadata with the natural language query using natural language processing, wherein the natural language processing comprises parsing the natural language query into one or more schemes and associating the one or more schemes with the electronic metadata;
- calculating a plurality of correlation scores between the natural language query and each of the plurality of computerized datasets, wherein a given correlation score is calculated for each of the plurality of computerized datasets based on a result of the natural language processing;
- returning to the user, via the network, one or more correlated datasets of the plurality of computerized datasets with a correlation score greater than or equal to a threshold;
- grouping two or more of the plurality of computerized datasets in a group with each other based on coarse-grained metadata;
- determining one or more associations between the two or more of the plurality of computerized datasets in the coarse-grained metadata group based on fine-grained metadata;
- wherein the correlating of the electronic metadata with the natural language query comprises capturing one or more implicit text correlations between the electronic metadata of the plurality of computerized datasets and the natural language query using one or more features;
- wherein the calculating is performed using a distributional semantic similarity method;
- wherein the distributional semantic similarity method comprises automatically capturing one or more word relations between the electronic metadata of the two or more of the plurality of computerized datasets based on one or more contextual words found in unstructured data;
- calculating correlations between words of the two or more of the plurality of computerized datasets;
- calculating correlations between the two or more of the plurality of computerized datasets by aggregation, wherein the aggregation includes summing and normalizing the calculated word level correlations;
- wherein determining the one or more associations between the two or more of the plurality of computerized datasets comprises:
  - determining one or more representative semantic words between the two or more of the plurality of computerized datasets representing a correlation type between the two or more of the plurality of computerized datasets; and
  - computing a normalized weight indicating a correlation strength of the correlation type between the two or more of the plurality of computerized datasets;
  - wherein the correlation type comprises a data type describing data in the two or more of the plurality of computerized datasets;
- filtering the plurality of computerized datasets according to at least one correlation type and corresponding correlation strength; and
- selecting the one or more correlated datasets of the plurality of computerized datasets to return to the user based at least in part on the filtering.

16. The computer program product according to claim 15, wherein the coarse-grained metadata comprises descriptions and tags in the two or more computerized datasets.

* * * * *